United States Patent [19]

Roberts et al.

[11] Patent Number: 4,875,014
[45] Date of Patent: Oct. 17, 1989

[54] SYSTEM AND METHOD FOR LOCATING AN UNDERGROUND PROBE HAVING ORTHOGONALLY ORIENTED MAGNETOMETERS

[75] Inventors: George F. Roberts, Georgetown; Philip H. Walters, Austin, both of Tex.

[73] Assignee: Tensor, Inc., Round Rock, Tex.

[21] Appl. No.: 221,730

[22] Filed: Jul. 20, 1988

[51] Int. Cl.⁴ .................. E21B 47/022; E21B 47/09; E21B 47/12; E21B 7/04

[52] U.S. Cl. ................................ 324/326; 33/304; 73/151; 175/26; 175/45; 324/346

[58] Field of Search ................. 324/207, 208, 67, 326, 324/345, 346; 73/151; 340/551, 989; 175/26, 45, 61; 33/304, 312, 313; 364/424.02, 449; 342/459

[56] References Cited

U.S. PATENT DOCUMENTS

| | | | |
|---|---|---|---|
| 3,406,766 | 10/1968 | Henderson | 175/61 |
| 3,529,682 | 9/1970 | Coyne et al. | 340/551 X |
| 3,589,454 | 6/1971 | Coyne | 175/45 X |
| 3,712,391 | 1/1973 | Coyne | 175/45 X |
| 3,853,185 | 12/1974 | Dahl et al. | 175/61 X |
| 3,862,499 | 1/1975 | Isham et al. | 33/312 |
| 4,316,253 | 2/1982 | Possémé | 324/326 X |
| 4,646,277 | 2/1987 | Bridges et al. | 324/346 X |
| 4,710,708 | 12/1987 | Rorden et al. | 324/326 X |

Primary Examiner—Gerald R. Strecker
Attorney, Agent, or Firm—Cox & Smith Incorporated

[57] ABSTRACT

A method and system for tracking a borehole by means of a probe and an externally produced magnetic field. The magnetic field is produced by a current configuration which facilitates the calculation of the magnitude and direction of the magnetic field at any point in space. In order to locate the probe, magnetometers within the probe are used to measure the magnetic field. Accelerometers within the probe allow the determination of the probe's orientation which enables the measured field vector to be compared to the calculated field vector and the probe's location thereby ascertained.

7 Claims, 5 Drawing Sheets

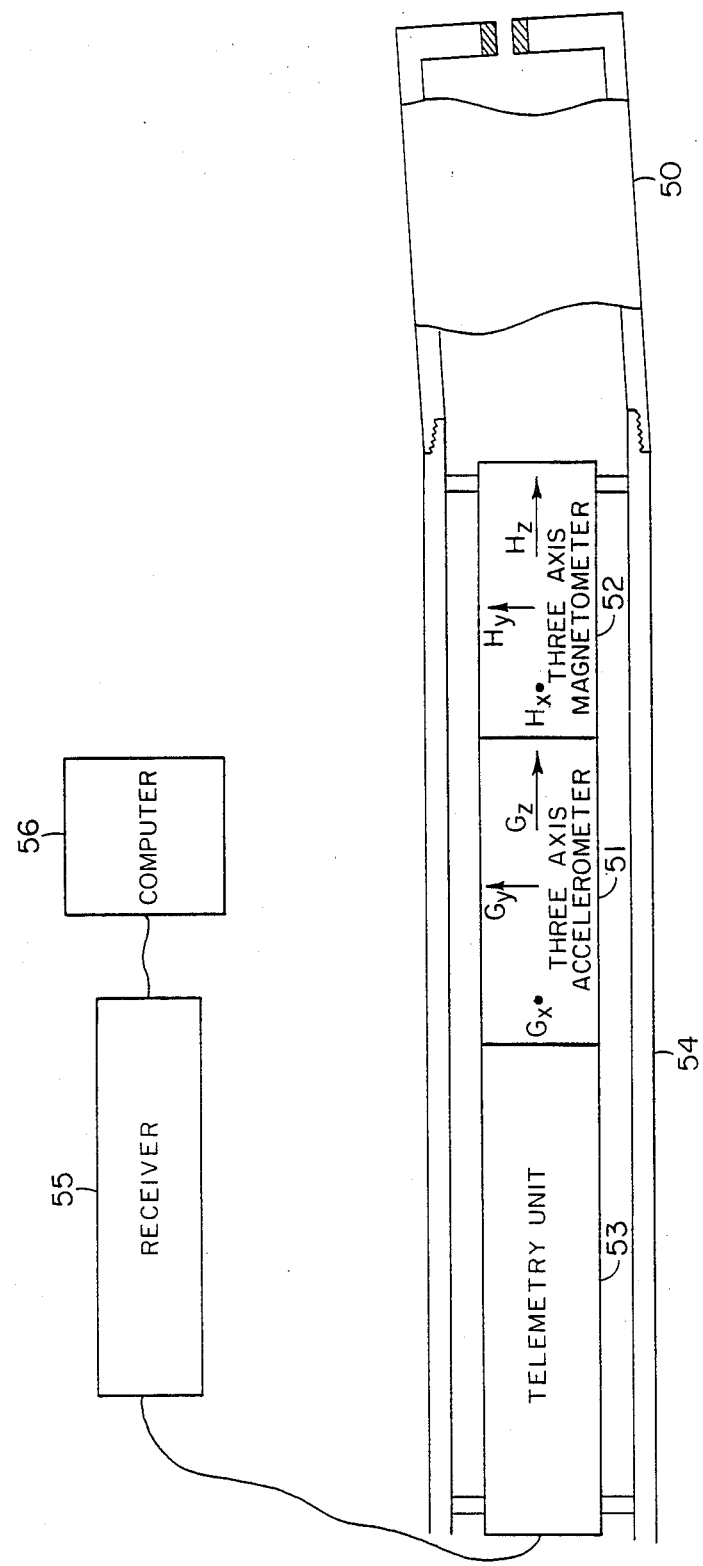

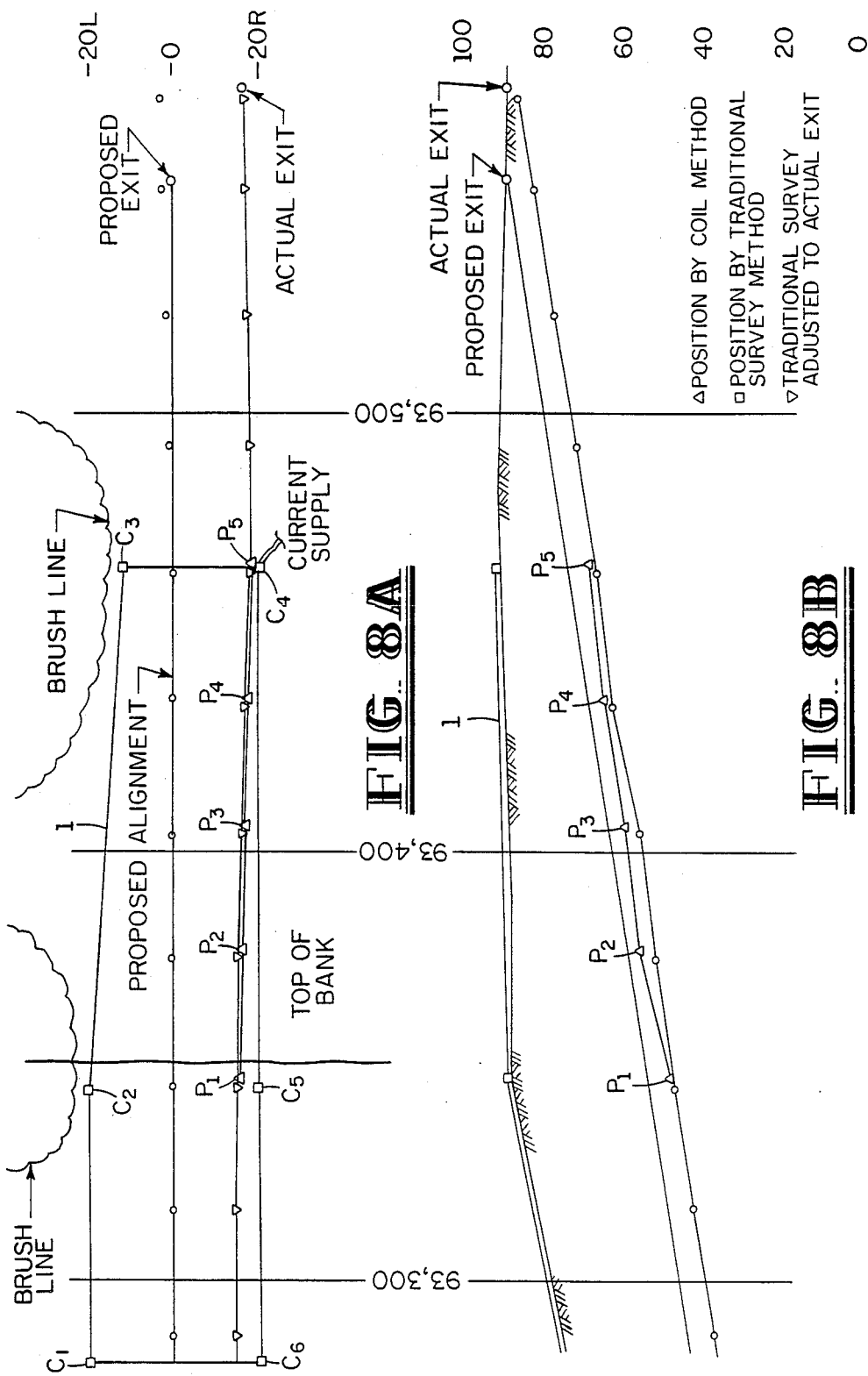

SYSTEM AND METHOD FOR LOCATING AN UNDERGROUND PROBE HAVING ORTHOGONALLY ORIENTED MAGNETOMETERS

BACKGROUND OF THE INVENTION

1. Field of the Invention

The present invention relates to a method and system for tracking the position of a probe attached to a directional drilling assembly. Specifically, the present invention provides a method and apparatus for monitoring the actual location of a drilling assembly during the drilling operation to permit necessary adjustments in drilling direction.

2. Background

Directional drilling refers to a well-known drilling technique whereby the direction of the borehole may be chosen by the operator. Directional drilling has been in use for many years. One application of directional drilling is in conjunction with placing underground transmission lines such as utility lines. communication lines, or pipelines across manmade or natural obstacles. Common obstacles are rivers or other bodies of water, city streets and highways. In order to traverse the obstacle, the drilling assembly must tunnel underneath the obstacle from an above-ground entry point to a desired exit point. The borehole thus created serves to contain the pipeline or other type of transmission line. In many obstacle traversals, the borehole must remain in an assigned right of way as it crosses underneath the obstacle. The point where the borehole exits the ground must also stay within a certain predefined area. Those problems are compounded by the fact that many such underground obstacle traversals cover a considerable distance.

The equipment commonly used to guide a directional drilling assembly as it creates a borehole is a steering tool. Such a steering tool is described in U.S. Pat. No. 3,862,499, the disclosure of which is hereby incorporated by reference. The steering tool allows an operator to change or adjust the orientation of the drilling assembly such that a borehole is created in a corresponding direction. The steering tool itself, however, does not feed back information to the operator indicating the position of the borehole. Thus, the borehole must be directionally drilled in open-loop fashion dependent on the accuracy of the steering tool and land survey data. The accuracy of steering tools in use today, however, is not entirely satisfactory. That lack of accuracy can cause (and frequently does cause) the borehole to deviate greatly from the desired course. Errors in land survey data can also cause such deviation. When the deviation is beyond acceptable limits, which it often is, the borehole must be redrilled. Such redrilling is, of course, costly and time consuming. Even the possibility that redrilling may be necessary is sometimes enough to make some obstacle crossings uneconomical to even attempt. There has been a long-felt need, therefore, for a method and apparatus which would allow an operator to accurately track the progress of a borehole as it is created by a directional drilling assembly such that errors in the borehole's course can be corrected as they occur.

The problem has been addressed in the past through a variety of methods, all of which are largely unsuccessful. For example, methods exist in the prior art which use magnetic fields to guide the directional drilling of a borehole. For example, U.S. Pat. Nos. 3,406,766 and 3,853,185 disclose methods utilizing a magnetic field source which guides the drilling by means of a probe fixed to the drilling assembly for detecting the direction of the magnetic field. Since the absolute location of the probe is not determined by the field measurement, however, the accuracy of each succeeding measurement is dependent on preceding ones. Any measurement errors are thus cumulatively propagated during the entire drilling procedure. One major reason for such measurement errors is magnetic interference from extraneous sources.

U.S. Pat. Nos. 3,529,682, 3,589,454 and 3,712,391 describe a two-loop antenna system for generating two time-varying magnetic fields with differing frequencies. The position and heading of the drilling device is determined by means of magnetometers mounted within the drilling device One of the loops is a dipole antenna while the other loop is a quadrupole antenna. Filters are used to separate the voltage signals produced by each coil which are due to each loop antenna. By measuring the relative and absolute magnitudes of the dipole and quadrupole fields, the depth and lateral displacement of the probe with respect to the two-loop antenna can be determined. The system does not allow, however, for a determination of the probe's position along the length of the drillig path from the magnetic field data. The geometry of the two-loop antenna is also critical for the system to perform properly which can complicate long distance obstacle crossings where the surface environment would not permit a particular loop configuration.

It is an object of the present invention, therefore, to provide a system and method for determining the location of a probe fixed to a drilling assembly from a magnetic field generated by one or more loop antennas constructed of straight segments but otherwise of arbitrary size and shape.

It is a further object to provide a system relatively unaffected by magnetic interference from extraneous sources.

It is a still further object to provide a system whereby each measurement of the magnetic field at the location of the probe is independent of every other, thus avoiding any cumulative propagation of measurement errors.

The present invention permits accurate monitoring of the actual location of the drilling assembly underground during the drilling operation. That information can be used by the driller to make the necessary adjustments in directing the steering tool so that the borehole stays within the right of way and exits the ground within acceptable limits.

SUMMARY OF THE INVENTION

The present invention employs an externally generated magnetic field sensed by a steering tool system with a probe fixed to the drilling assembly to track the progress of the borehole. The probe is located in a section of drill pipe immediately behind the drill bit. The position of the drill bit is determined by measuring the magnetic field vector at the probe's actual location and matching that vector to calculated field vectors corresponding to different locations. That permits extremely accurate location of the drill bit thereby allowing for adjustments to be made in order to keep the borehole on course. Because each field measurement and matching to a calculated value is done independently, cumulative error propagation is avoided.

The externally generated magnetic field is produced by a current loop (or loops) made up of straight line segments. That configuration facilitates the calculation of magnetic field vectors at different points in space as is described below. According to the present method, a magnetic field is first generated by a constant current flowing through the loop in one direction, and an oppositely oriented field is then generated by a constant current flowing in the other direction. The measured field vectors are then vectorially subtracted (corresponding to addition of the generated magnetic fields since those fields are oppositely oriented) which cancels out of the measurement any contribution from the earth's magnetic field or any other magnetic field produced by sources other than the current loop. In order to determine the probe's position, the magnetic field vector corresponding to the vectorial subtraction is matched to a theoretical magnetic field vector produced by a current having a magnitude equal to the sum of the magnitudes of the currents actually applied to the current loop to generate each of the magnetic fields.

In order to measure the magnetic field, the probe has three magnetometers orthogonally oriented to one another. The magnetometers thus measure the x′, y′, and z′ components (corresponding to the probe coordinate system) of the magnetic field vector. In order to match the measured vector in the probe coordinate system with that of the calculated field vector in the normal coordinate system, a coordinate transformation is performed. The three accelerometers of the probe measure rotation of the probe with respect to the gravitational force vector. Suitable telemetry equipment then sends the sensor data via wireline to a digital computer at the surface for calculation in accordance with the present invention.

BRIEF DESCRIPTION OF THE DRAWINGS

FIG. 3 is a schematic diagram showing a typical steering tool system.

FIGS. 8A and 8B show a detailed view from above and vertical cross-section of the latter portion of the drill path shown in FIGS. 7A and 7B.

DETAILED DESCRIPTION OF THE INVENTION

Figure 1:
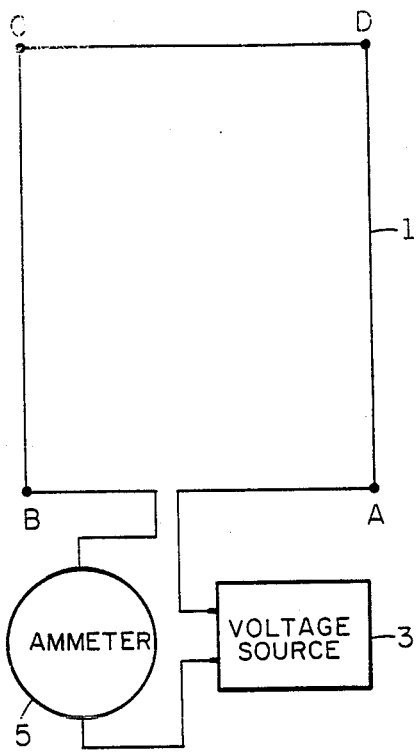
FIG. 1 is a plane schematic of a current loop in accordance with the present invention.

According to the present invention, a loop 1 made up of straight line segments and suitable for carrying current is configured as shown in FIG. 1. Connected to the loop 1 is an appropriate D.C. voltage source 3 which may be a battery, a D.C. constant current welder or other types of D.C. voltage generators. A current measuring device 5 is used to determine the current flowing in the loop, the value of which is used in the calculations described below. In the preferred embodiment, all data are input to a suitable digital computer programmed for performing the appropriate calculations and data storage according to the present method.

A suitable steering tool system is shown schematically in FIG. 3. A conventional directional jetting drill bit 50 is shown along with the steering tool system. Since the drill bit 50 is offset from the centerline of the rest of the drilling assembly, the direction of the drilling is determined by the roll angle $\alpha$ (i.e., extent of rotation about the longitudinal axis) which is measurable by the steering tool system. The components of the steering tool system include a probe consisting of a three axis accelerometer 51 and a three axis magnetometer 52, and a data acquisition and telemetry unit 53 all mounted within the drilling assembly behind the drill bit in a non-magnetic section of drill pipe 54. The directional measuring axes of the accelerometer and magnetometer are as shown in the drawing with the z axis along the length of the drill pipe, the y axis pointing upward, and the x axis perpendicular to the plane of the paper. The telemetry unit sends data to an above-ground receiver 55 which then inputs the data to an appropriately programmed digital computer 56. Information regarding azimuth, inclination, and roll angles are output to an appropriate display device. Such a steering tool system is manufactured by Tensor, Inc., of Austin, Tex. Prior methods of directional drilling utilize steering tool systems in conjunction with the earth's magnetic field to guide the drilling. The same system, however, may be used with magnetic fields generated by conductive loops in accordance with the present invention.

Figure 2:
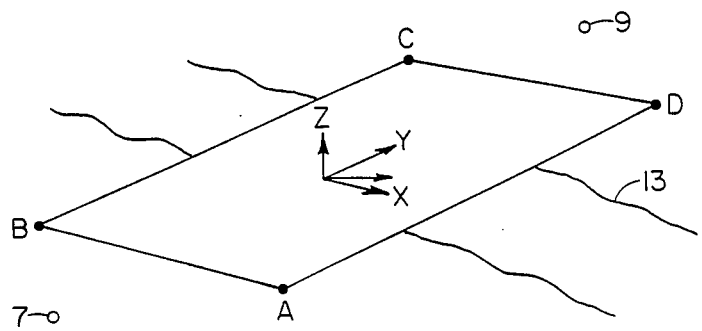
FIG. 2 shows a perspective schematic view of a current loop in relation to the normal coordinate system over an obstacle, in this case, a river.
Figure 4:
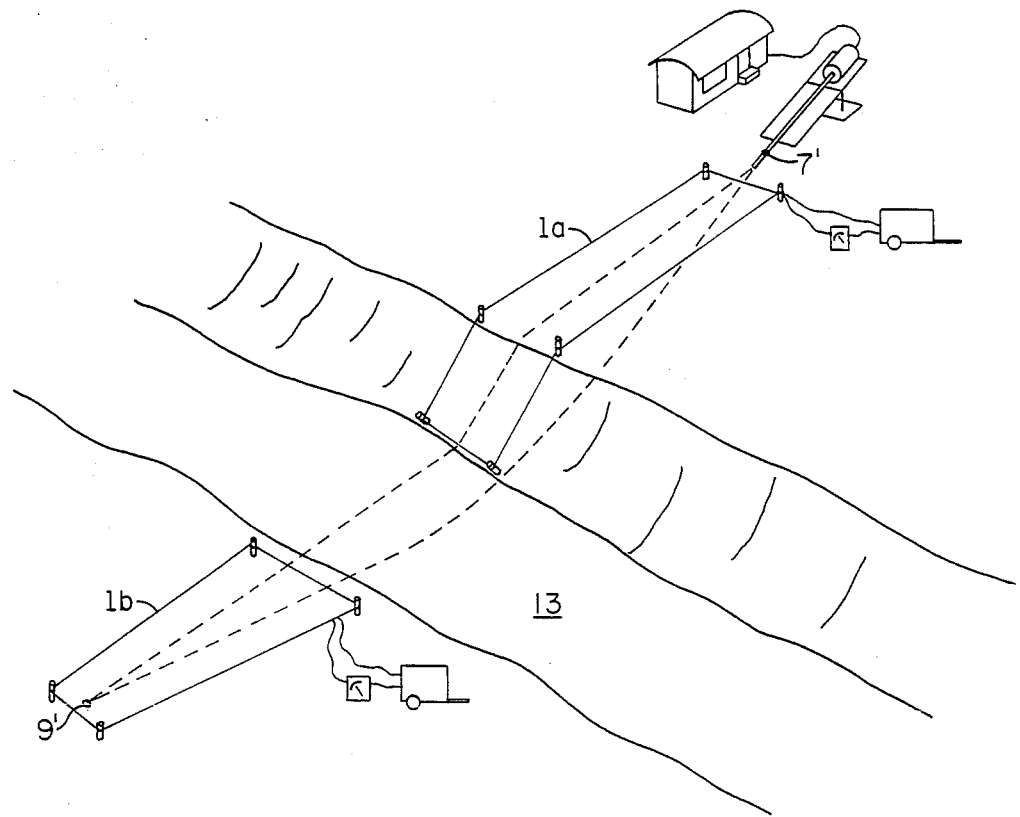
FIG. 4 shows two current loops in accordance with the present invention positioned to track the drilling under a river.

FIG. 2 shows a perspective view of the single loop 1 positioned to track the drilling under a river or other obstacle 13 from an entry point 7 to an exit point 9. According to the present invention, the loop may be an arbitrarily shaped polygon constructed of straight segments. Also, any number of loops may be employed. For example, as shown in FIG. 4, two loops 1a and 1b may be placed on either side of a river 13 to track the drilling from entry point 7′ to exit point 9′.

As the drilling progresses underneath the obstacle, the magnetic field vector H produced by the loop 1 is measured by means of a probe fixed to the drilling assembly as shown in FIG. 3. The measurement axes of the magnetometers are orthogonally oriented to one another so that the x′, y′, and z′ components of H are measured where x′, y′, and z′ represent the axes of the probe coordinate system. If the probe is oriented horizontally (i.e., an inclination angle of 90° as shown in FIG. 3) and pointed in the direction of the exit point with a zero roll angle, the z′ axis is directed longitudinally toward the exit point, the x′ axis is directed horizontally toward the left if facing toward the exit point, and the y′ axis is directed vertically upward. As shown in FIG. 2, the normal coordinate system, with respect to which the calculations described below are made, has x, y, and z coordinates where the z axis is vertical, the y axis is parallel to the ground in the direction from the drilling entry point to the exit point, and the x axis is parallel to the ground and directed horizontally.

The three magnetometers allow the determination of the magnitude and direction of the vector H with respect to the probe coordinate system. In order to determine the magnitude and direction of H with respect to the normal coordinate system, the orientation of the probe must be known. Therefore, the three accelerometers measure gravitational force in the x', y', and z' directions, designated $G_x$, $G_y$, and $G_z$. By this means, the inclination and roll angles of the probe may be determined where the inclination angle $\phi$ refers to the degree of rotation of the probe about the normal z axis and the roll angle $\alpha$ refers to the degree of rotation about the normal y axis:

$$\phi = \arctan\sqrt{\frac{G_x^2 + G_y^2}{G_z}}$$

$$\alpha = \arctan\frac{G_x}{G_y}$$

The azimuth angle, or degree of rotation of the probe about the vertical axis, cannot be measured with the accelerometers since the gravity force vector is parallel to the z axis although the aximuth can be determined using the magnetometers in conjunction with the accelerometers. However, in most applications, it can be assumed that the azimuth angle remains relatively parallel to the intended course as the obstacle is traversed by the borehole. By knowing the inclination and roll angles, $\phi$ and $\alpha$, the measured H vector may be mapped to the normal coordinate system by a rotation of axes transformation as described below. The resulting H vector may then be compared with the calculated H vector values corresponding to the particular loop configuration and current magnitude in order to locate the probe within the x, y, and z coordinate system.

In the preferred embodiment, the magnetic field vector H which is to be measured by the probe is actually the vector resulting from the vectorial subtraction of two oppositely oriented magnetic fields generated by sequentially applying voltage to the loop which causes current flow in opposite directions. That is, in a first measurement, a current $j_f$ (as measured by the current measuring device 5) is applied to the loop 1. The resulting magnetic field vector $H_f$ is measured by the probe. Next, in a second measurement, an oppositely oriented current, $j_r$, is applied to the loop with the resulting magnetic field vector $H_r$ again measured. The current and magnetic field vectors are then vectorially subtracted to obtain the current magnitude value j and magnetic field vector value H which is to be used in the calculations:

$$j = j_f - j_r \qquad [1]$$

$$H = H_f - H_r \qquad [2]$$

Since the current and magnetic field vectors are of opposite sign in the two cases, the vectorial subtraction is actually addition of the respective magnitudes. In that manner, magnetic interference with the field measurement due to extraneous sources such as the earth's magnetic field is effectively cancelled by the vectorial subtraction since it is expected that the same extraneous field would be present in both the first and second measurements.

In order to determine the location of the probe relative to the loop 1, the magnetic field vector H* produced by the loop 1 is calculated for discrete locations as defined by the x, y, and z axes. The number of locations for which the calculation is performed is, of course, variable and depends on the degree of precision desired in locating the probe. Each calculated magnetic field vector H*, as specified by its x, y, and z components $H^*_x$, $H^*_y$, and $H^*_z$, is calculated as described below according to the geometry of the loop 1 and the magnitude j of the current flowing within the loop 1. The calculation is performed iteratively until a match to the measured H vector is found (i.e., the values of x, y, and z components of H and H* are equal). The location of the probe is then determined to be at the point defined by the x, y, and z coordinates corresponding to the matched calculated H* vector.

The calculation procedure in accordance with the present method described above will now be set forth in greater detail.

First, the distribution of the magnetic field H* generated by a current of magnitude j flowing within each loop is calculated for discrete locations as defined by x, y, and z coordinates. The calculation of the field H* is facilitated by the fact that the loop is made up of straight segments. As aforesaid, a loop with any number of straight segments and of arbitrary polygonal shape may be used in accordance with the present method. The method will be described with reference to the four-segment loop shown in FIGS. 1 and 2 for reasons of simplicity, however.

Figure 6:
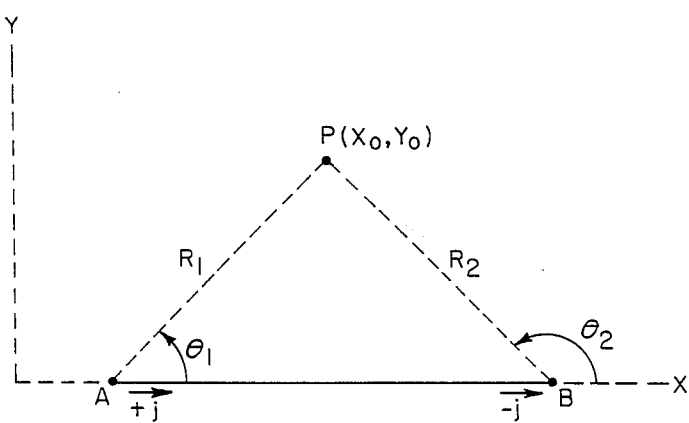
FIG. 6 illustrates the calculation of the magnetic field vector H produced by a current segment.

The magnetic field emanating from a straight segment of a conductor can be modeled as the field radiated by a current source and a current sink located at each end of the conductor. With reference to FIG. 6, the magnitude of the radiated magnetic field vector $H_1$ produced at a point P $(x_o, y_o)$ located a distance $R_1$ from a current source at point A(a, o) is given by:

$$|H_1| = \frac{j}{R_1} \frac{1 + \cos\theta_1}{\sin\theta_1} \qquad [3]$$

where j is the current magnitude at the source and $\theta_1$ is the angle between the conductor and the line from P to A. (See Manneback, "Radiation from Transmission Lines", Journal of the A.I.E.E., February, 1923, p. 95). The magnitude of the field $H_2$ produced at a point P by a current sink at point B (b, o) located at the other end of the current segment is similarly given by:

$$|H_2| = \frac{-j}{R_2} \frac{1 + \cos\theta_2}{\sin\theta_2} \qquad [4]$$

where $R_2$ is the distance from P to current sink at B and $\theta_2$ is the angle between the line from P to B and the conductor. For mathematical simplicity, the current magnitude is either positive or negative for the case of a current source or sink, respectively. In both cases, the vectors $H_1$ and $H_2$ are oriented in a direction perpendicular to the plane defined by the conductor and the line from P to either A or B. Thus, the total magnitude of the field from a straight conductor segment is the superposition of the two fields generated by the source and the sink:

$$\begin{aligned}|H_{12}| &= |H_1| + |H_2| \qquad [5]\\ &= \frac{j}{R_1}\frac{1+\cos\theta_1}{\sin\theta_1} - \frac{j}{R_2}\frac{1+\cos\theta_2}{\sin\theta_2}\\ &= \frac{j}{y_0}\cos\theta_1 - \cos\theta_2\end{aligned}$$

where $Y_o = R_1 \sin \theta_1 = R_2 \sin \theta_2$ is the perpendicular distance from point P to a line coincident with the conductor.

The same result can be derived from the Biot-Savat formula where the magnitude of the field produced by a differential current segment of length dx is:

$$|dH| = \frac{j \sin \theta \, dx}{R^2}$$

For the entire length of the segment in FIG. 6 from x=a to x=b:

$$\begin{aligned}
H &= \int_a^b \frac{j \sin \theta \, dx}{R^2} = \int_a^b \frac{j y_0 \, dx}{R^3} \\
&= \int_a^b \frac{j y_0 \, dx}{[(x_0 - x)^2 + y_0^2]^{3/2}} \\
&= j y_0 \frac{1}{y_0^2} \left( \frac{-(x_0 - x)}{\sqrt{(x_0 - x)^2 + y_0^2}} \right)_{x=b}^{x=a} \\
&= \frac{j}{y_0} \left[ \frac{x_0 - a}{\sqrt{(x_0 - a)^2 + y_0^2}} - \frac{x_0 - b}{\sqrt{(x_0 - b)^2 + y_0^2}} \right] \\
&= \frac{j \cos \theta_1 - \cos \theta_2}{Y_0}
\end{aligned}$$

which agrees with equation [5] above.

Referring to FIG. 1, each corner of the loop 1 can be thought of as a current source and a current sink for the straight segments defining the corner. This is shown schematically in FIG. 2 for the corners labeled A, B, C, and D of loop 1. For each corner, the H* vector is calculated using both equations [3] and [4] since each corner is both a current source and a current sink. To obtain the total H* vector at a particular point (x,y,z), the H* vectors produced by all of the current sources and sinks are vectorially added. Alternatively, the H* vectors can be calculated from each straight segment as defined by two corners using equation [5] which is, of course, mathematically equivalent.

In order to compute the H* vectors, the procedure described above is easily implemented on a digital computer. First, a normal (x,y,z) coordinate system is defined with respect to the loop 1 as shown in FIG. 2. Which point is chosen as the origin is arbitrary. The following variable definitions apply:

(1) P is vector from the origin defining a point $(P_x, P_y, P_z)$ in (x,y,z) space at which the H* vector is to be computed.

(2) A, B, C, D are vectors from the origin defining the location of the current source or sink producing the H* field for each of the corners A, B, C, and D in FIG. 2.

(3) I is a unit vector $(I_x, I_y, I_z)$ in the direction of the straight conductor segment as the loop 1 is traced clockwise, i.e., for the segment AB in FIG. 2, $$\begin{aligned}
I &= \frac{A - B}{|A - B|} \\
&= \left[ \frac{A_x - B_x}{|A - B|}, \frac{A_y - B_y}{|A - B|}, \frac{A_z - B_z}{|A - B|} \right]
\end{aligned}$$

(4) j is the scalar magnitude of the current in the loop 1 which is positive for a current source and negative to a sink.

(5) R is the vector from the point P to the current source, i.e., $R = P - N$.

(6) $\theta$ is the angle between I and R.

(7) U is a unit vector in the direction of R, i.e.,

From the right-hand rule of electromagnetic theory, the $$U = \frac{R}{|R|}$$

From the right-hand rule of electromagnetic theory, the direction of the H* vector at any point P will be in the same direction as I×U. A unit vector in this direction is therefore given by:

$$H^*_{unit} = \frac{I \times U}{|I \times U|} = \frac{I \times U}{|I| \, |U| \sin \theta}$$

Since I and U are unit vectors:

$$H^*_{unit} = \frac{I \times U}{\sin \theta} \qquad [6]$$

The following vector identities apply:

$$\cos \theta = \frac{I \cdot U}{|I| \, |U|} = \frac{I \cdot U}{(1)(1)} = I \cdot U$$

$$\sin \theta = \sqrt{1 - \cos^2 \theta} = \sqrt{1 - (I \cdot U)^2}$$

Therefore, from equations [3] and [4]:

$$\begin{aligned}
H^* &= |H^*| \, H^*_{unit} \qquad [7] \\
&= |H^*| \frac{I \times U}{\sqrt{1 - (I \cdot U)^2}} \\
&= \frac{j}{R} \frac{(1 + (I \cdot U))}{\sqrt{1 - (I \cdot U)^2}} \cdot \frac{I \times U}{\sqrt{1 - (I \cdot U)^2}} \\
&= (I \times U) \frac{j(1 + (I \cdot U))}{R(1 - (I \cdot U)^2)}
\end{aligned}$$

In order to perform the vector summation of the H* vectors produced by all the current sources and sinks, the H* vector given by equation [7] above must be resolved into its x, y, and z components $H^*_x$, $H^*_y$, and $H^*_z$.

The following vector identities apply:

$$I \cdot U = I_x U_x + I_y U_y + I_z U_z$$

$$I \times U = (I_y U_z - I_z U_y, \, I_z U_x - I_x U_z, \, I_x U_y - I_y U_x)$$

Therefore, from equation [7]:

$$H^*_x = (I_y U_z - I_z U_y) \frac{j(1 + (I \cdot U))}{R(1 - (I \cdot U)^2)}$$

$$H^*_y = (I_z U_x - I_x U_z) \frac{j(1 + (I \cdot U))}{R(1 - (I \cdot U)^2)}$$

$$H^*_z = (I_x U_y - I_y U_x) \frac{j(1 + (I \cdot U))}{R(1 - (I \cdot U)^2)}$$

Thus, the H* field components produced by a current source or sink located at corners A, B, C, and D of loop 1 in FIG. 2 can be calculated for any point P. In order to obtain the total field at point P produced by loop 1, the principle of superposition is applied so that:

$$H^*_{total} = \sum_{K=A, B, C, D} \sum_{j=j, -j} H^*_k$$

where each $H^*_k$ is a three-dimensional vector ($H^*_{kx}$, $H^*_{ky}$, $H^*_{ka}$). $H^*_k$ is calculated as above for the point P as emanating from a current source and a current sink for each corner A,B,C, and D of the loop 1 in FIG. 2. $H^*_{total}$ is then given by vectorial summation of each calculated $H^*_k$.

The method is simply extended to a loop having M corners. There are then 2M current sources and sinks for which the H* vector must be calculated. The sum of the individual H* vectors gives the total field at point P as before:

$$H^*_{total} = \sum_{K=1}^{K=M} \sum_{j=j, -j} H^*_k$$

In order to compare the calculated H* with the H vector measured by the probe, the H vector must be mapped from the probe coordinate system to the normal coordinate system of FIG. 2. The relationship between the two coordinate systems is known from the accelerometer data which gives the inclination angle $\phi$ and roll angle $\alpha$ (again, the azimuth angle is assumed to remain constant). Therefore, a rotation of axes transformation applied to the probe coordinate system gives the required mapping function. This transformation is depicted in FIG. 5 for the case where $\alpha$ is equal to zero and $\phi$ equal to $\pi/2$.

First, the H' vector is rotated about the z axis by an angle equal to $\pi - \alpha$ by multiplying H' by a matrix $R_\alpha$ where:

$$R_\alpha = \begin{bmatrix} \cos(\pi - \alpha) & -\sin(\pi - \alpha) & 0 \\ \sin(\pi - \alpha) & \cos(\pi - \alpha) & 0 \\ 0 & 0 & 1 \end{bmatrix}$$

$$= \begin{bmatrix} -\cos\alpha & -\sin\alpha & 0 \\ \sin\alpha & -\cos\alpha & 0 \\ 0 & 0 & 1 \end{bmatrix}$$

Figure 5A:
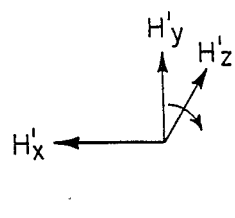
FIGS. 5A–C shows the rotation of axes transformations in going from the probe coordinate system to the normal coordinate system.

The result of this rotation is shown in FIG. 5(a).

Figure 5B:
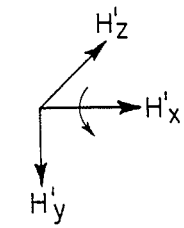

Second, the H' vector ($H_x'$, $H_y'$, $H_z'$) as shown in FIG. 5(b) is rotated about the x axis by an angle equal to $\pi - \alpha$ by multiplying H' by a matrix $R_\phi$ where:

$$R_\phi = \begin{bmatrix} 1 & 0 & 0 \\ 0 & \cos(\pi - \phi) & -\sin(\pi - \phi) \\ 0 & \sin(\pi - \phi) & \cos(\pi - \phi) \end{bmatrix}$$

$$= \begin{bmatrix} 1 & 0 & 0 \\ 0 & -\cos\phi & -\sin\phi \\ 0 & \sin\phi & -\cos\phi \end{bmatrix}$$

Figure 5C:
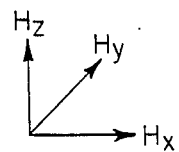

The result is depicted in FIG. 5(c). Thus, to map the vector H in the probe coordinate system to a vector H in the normal coordinate system:

$$H = H' R_\alpha R_\phi \quad [8]$$

$$= [H'_x, H'_y, H'_z] \begin{bmatrix} -\cos\alpha & -\sin\alpha & 0 \\ \sin\alpha & -\cos\alpha & 0 \\ 0 & 0 & 1 \end{bmatrix}$$

$$\begin{bmatrix} 1 & 0 & 0 \\ 0 & -\cos\alpha & \sin\alpha \\ 0 & \sin\alpha & -\cos\alpha \end{bmatrix}$$

$$= [H'_x, H'_y, H'_z] \begin{bmatrix} -\cos\alpha & \sin\alpha\cos\phi & \sin\alpha\sin\phi \\ \sin\alpha & \cos\alpha\cos\phi & \cos\alpha\sin\phi \\ 0 & \sin\phi & -\cos\phi \end{bmatrix}$$

Therefore, resolving the H vector into x,y, and z components:

$$H_x = -H'_x \cos\alpha + H'_y \sin\alpha$$

$$H_y = H'_x \sin\alpha\cos\phi + H'_y \cos\alpha\cos\phi + H'_z \sin\phi$$

$$H_z = H'_y \sin\alpha\sin\phi + H'_y \cos\alpha\sin\phi - H'_z \cos\phi$$

Where, from the accelerometer data:

$$\cos\phi = \frac{-G_z}{\sqrt{G_x^2 + G_y^2}}$$

$$\sin\phi = \frac{G_x^2 + G_y^2}{\sqrt{G_x^2 + G_y^2 + G_z^2}}$$

$$\cos\alpha = \frac{G_y}{\sqrt{G_x^2 + G_y^2}}$$

$$\sin\alpha = \frac{G_y}{\sqrt{G_x^2 + G_y^2}}$$

Thus, in summary, the inclination and roll angles of the probe are computed from the accelerometer data. The accelerometer data may be taken repeatedly and averaged, if desired, to remove noise from the measurement. The x', y', and z' components of the magnetic field vector $H_r'$ and $H'_f$ generated by a current with magnitude $j_f$ and a current with magnitude $j_r$ flowing in the opposite direction are then measured and stored. The vectorial subtraction of $H_r'$ from $H_f'$ then gives a measurement of the field vector H' produced at the probe's location by a current with magnitude j (where $j = j_f - j_r$) and with extraneous magnetic interference cancelled out by the vectorial subtraction. Next, the resulting H' vector is transformed from the probe coordinate system (x',y', z') to the normal coordinate system (x,y,z) as shown in FIG. 5 by equation [8] to give a field vector H. The vector H can then be compared directly with the calculated magnetic field vector H* to determine the location of the probe by finding the point P where H* most nearly equals H.

Although the description above has been with reference to a single current loop, the present method may be used with any number of current loops with no modification. If multiple current loops are used, however, it is possible to ascertain the location of the probe simply by measuring the direction of the magnetic field vector and disregarding its absolute mangitude. In the calculated H* vectors, the absolute magnitude is similarly disregarded and matching is done for vector direction only using a triangulation procedure.

Figure 7A:
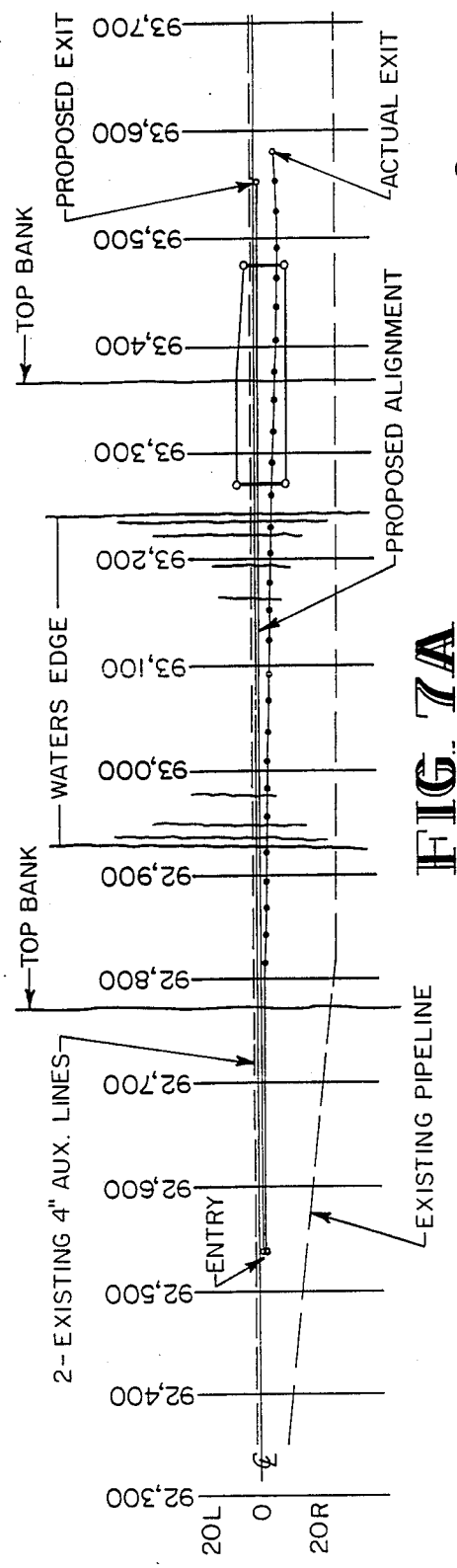
FIGS. 7A and 7B show a view from above and a vertical cross-section, respectively, of an actual experiment using the present invention.
Figure 7B:
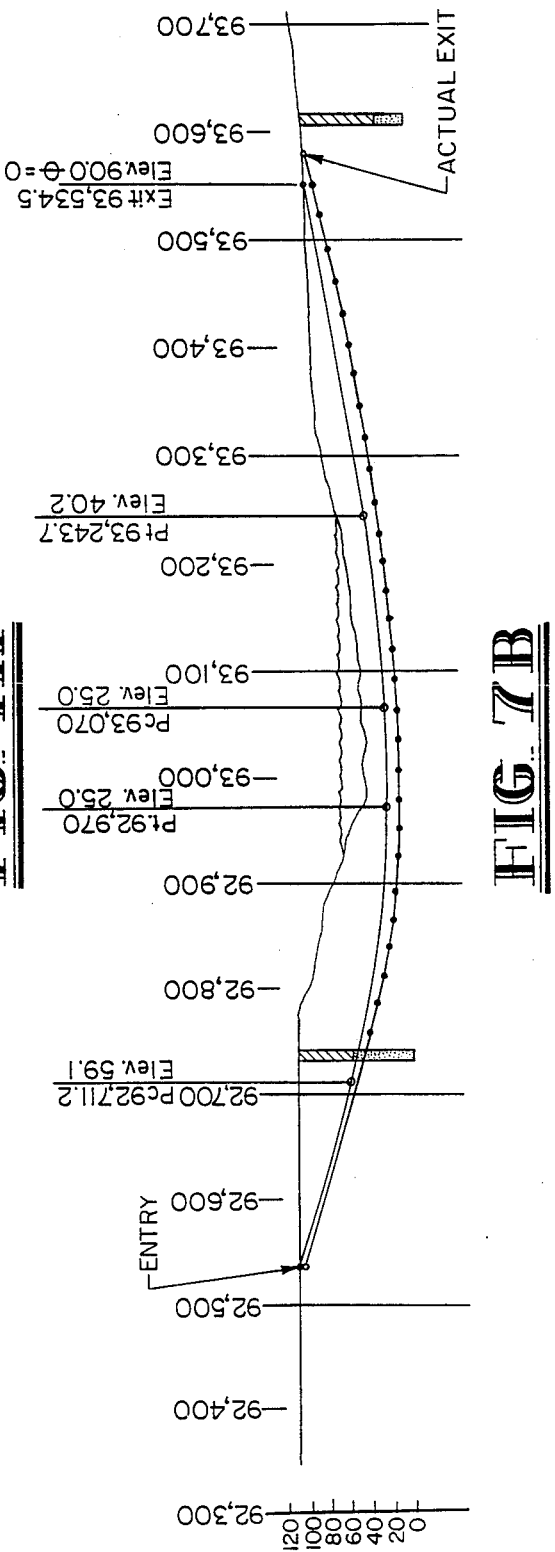

The results of an actual experimental river crossing utilizing the present invention will now be described with reference to FIGS. 7A-B and 8A-B. FIG. 7A depicts a plan view of the river crossing showing the proposed route of the pipeline and the actual route drilled. FIG. 7B shows the same points in a vertical cross-section. FIGS. 8A and 8B show a detailed plan view and vertical cross-section of the area around the loop 1 in FIG. 7A.

FIGS. 8A and 8B show the positions of the drill bit calculated in accordance with the present invention using current loop 1. These points are labeled P1 through P5 and are shown together with drill bit positions obtained by traditional survey methods both according to a proposed drilling path and adjusted afterwards to conform to the actual drilling exit point.

In order to facilitate the matching of calculated magnetic field vectors to measured ones, the vectors are expressed in terms of radial angle, radial intensity, and axial intensity:

$$\text{Measured Radial Angle} = \tan^{-1}\frac{H_z}{H_x}$$

$$\text{Calculated Radial Angle} = \tan^{-1}\frac{H_z^*}{H_x^*}$$

$$\text{Measured Radial Intensity} = \sqrt{H_z^2 + H_x^2}$$

$$\text{Calculated Radial Intensity} = \sqrt{H_z^{*2} + H_x^{*2}}$$

$$\text{Measured Axial Intensity} = H_y$$

$$\text{Calculated Axial Intensity} = H_y^*$$

$$\text{Radial Angle Match} = \tan^{-1}\frac{H_z}{H_x} - \tan^{-1}\frac{H_z^*}{H_x^*}$$

$$\text{Radial Intensity Match} = \sqrt{H_z^2 + H_x^2} - \sqrt{H_z^{*2} + H_x^{*2}}$$

$$\text{Axial Intensity Match} = H_y - H_y^*$$

The position of the probe and drill bit is determined by searching for the coordinates which minimize the radial angle match, the radial intensity match, and the axial intensity match. By representing the vectors in this fashion, the searching process is facilitated since the radial intensity of the loop generated magnetic field varies with the depth of the probe while the radial angle varies according to the probe's position right or left from the centerline of the loop.

In the present experiment, the loop 1 was used for position determination in only the latter portion of the drilling path. The location of the loop corners were as follows:

| | |
|---|---|
| Corner C1 location | 20.00 feet left of center |
| | 93261.50 feet toward exit |
| | 72.00 feet elevation |
| Corner C2 location | 20.00 feet left of center |
| | 93344.50 feet toward exit |
| | 88.00 feet elevation |
| Corner C3 location | 12.00 feet left of center |
| | 93465.50 feet toward exit |
| | 92.00 feet elevation |
| Corner C4 location | 20.00 feet right of center |
| | 93,465.50 feet toward exit |
| | 92.00 feet elevation |
| Corner C5 location | 20.00 feet right of center |
| | 93344.50 feet toward exit |
| | 88.00 feet elevation |
| Corner C6 location | 20.00 feet right of center |
| | 93261.50 feet toward exit |
| | 72.00 feet elevation |

The position of the drill bit was calculated for five points P1 through P5. The drill bit position was calculated twice for each point using separate magnetic field measurements and the results averaged to obtain a final calculated position. The drill bit's position toward the exit point (i.e., its position along the axis) was not calculated in this instance, being determined by monitoring the length of drill pipe put into the borehole.

In the calculations that follow, sensor values are first obtained from forward current which are labeled with a subscript f and then from reverse current which are labeled with a subscript r. The result of the vectorial subtraction of the current and magnetic field values is then transformed from the probe coordinate system to the normal coordinate system before printed out as the measured data from the sensors.

For point P1:

| |
|---|
| Bit position toward exit point is 93347.2 feet |
| $j_f = 51.45$, |
| $H_{xf} = -38712$ |
| $H_{yf} = -28479$ |
| $H_{zf} = -17562$ |
| $G_{xf} = 968.0$ |
| $G_{yf} = 203.5$ |
| $G_{zf} = -151.8$ |
| $j_r = -51.45$ |
| $H_{xr} = -37299$ |
| $H_{yr} = -29159$ |
| $H_{zr} = -17512$ |
| $G_{xr} = 968.0$ |
| $G_{yr} = 203.3$ |
| $G_{zr} = -151.8$ |
| Measured data from sensors: |
| Total change in current is 102.90 amps |
| Measured radial angle is 307.72 deg |
| Measured radial intensity is 1562.7 gammas |
| Measured axial intensity is 139.1 gammas |
| Radial angle match = −0.0 |
| Radial intensity match = 0.0 |
| Axial intensity match = 13.3 |

Bit is 16.88 feet right of center at an elevation of 50.99 feet.

$j_f = 52.1$,
$H_{xf} = -38784$
$H_{yf} = -28528$
$H_{zf} = -17574$

-continued
```
Gxf = 968.2
Gyf = 203.5
Gzf = -151.8
jr = -52.1
Hxr = -37274
Hyr = -29147
Hzr = -17512
Gxr = 968.0
Gyr = 203.9
Gzr = -151.6
```
Measured date from sensors:
Total change in current is 104.20 amps
Measured radial angle is 304.30 deg
Measured radial intensity is 1628.8 gammas
Measured axial intensity is 143.4 gammas
Radial angle match = 0.00
Radial intensity match = -0.1
Axial intensity match = 4.1

Bit is 15.27 feet right of center at an elevation of 51.21 feet.

Average bit position = 16.08 feet right of center and 51.10 feet elevation.

For point P2:

```
Bit position toward exit point is 93376.8 feet
jf = 52.8
Hxf = -38358
Hyf = -28903
Hzf = -17854
Gxf = 968.6
Gyf = 197.9
Gzf = -156.4
jr = -52.8
Hxr = -36666
Hyr = -29826
Hzr = -17829
Gxr = 968.6
Gyr = 197.7
Gzr = -156.6
```
Measured data from sensors:
Total change in current is 105.60 amps
Measured radial angle is 310.43 deg
Measured radial intensity is 1916.5 gammas
Measured axial intensity is 205.6 gammas
Radial angle match = -0.00
Radial intensity match = -0.0
Axial intensity match = 46.2

Bit is 16.84 feet right of center at an elevation of 58.11 feet.

```
jf = 52.2
Hxf = -38382
Hyf = -28915
Hzf = -17866
Gxf = 968.6
Gyf = 197.9
Gzf = -156.4
jr = -52.2
Hxr = -36690
Hyr = -29814
Hzr = -17829
Gxr = 968.4
Gyr = 197.7
Gzr = -156.6
```
Measured data from sensors:
Total change in current is 104.40 amps
Measured radial angle is 309.76 deg
Measured radial intensity is 1906.5 gammas
Measured axial intensity is 194.6 gammas
Radial angle match = 0.00
Radial intensity match = 0.0
Axial intensity match = 35.2

Bit is 16.56 feet right of center at an elevation of 58.17 feet.

Average bit position = 16.70 feet right of center and 58.14 feet elevation.

For point P3:

```
Bit position toward exit point is 93406.5 feet
jf = 52.4,
Hxf = -39090
Hyf = -28016
Hzf = -18379
Gxf = 973.6
Gyf = 172.5
Gzf = 155.5
jr = -52.4
Hxr = -37373
Hyr = -29121
Hzr = -18378
Gxr = 973.6
Gyr = 172.7
Gzr = -155.5
```
Measured data from sensors:
Total change in current is 104.80 amps
Measured radial angle is 313.16 deg
Measured radial intensity is 2028.7 gammas
Measured axial intensity is 231.7 gammas
Radial angle match = -0.00
Radial intensity match = 0.1
Axial intensity match = 21.6

Bit is 17.94 feet right of center at an elevation of 61.48 feet.

```
jf = 51.7
Hxf = -39150
Hyf = -28016
Hzf = -18403
Gxf = 973.4
Gyf = 172.5
Gzf = -155.5
jr = -51.7
Hxr = -37361
Hyr = -29085
Hzr = -18427
Gxr = 973.6
Gyr = 172.7
Gzr = -155.5
```
Measured data from sensors:
Total change in current is 103.40 amps
Measured radial angle is 311.33 deg
Measured radial intensity is 2066.8 gammas
Measured axial intensity is 268.4 gammas
Radial angle match = -0.00
Radial intensity match = 0.1
Axial intensity match = 55.9

Bit is 17.13 feet right of center at an elevation of 61.88 feet.

Average bit position = 17.54 feet right of center and 61.68 feet elevation.

For point P4:

```
Bit position toward exit point is 93436.1 feet
jf = 51.9
Hxf = -37786
Hyf = -29959
Hzf = -18256
Gxf = 965.4
Gyf = 217.4
Gzf = -149.4
jr = -51.9
Hxr = -35741
Hyr = -31173
Hzr = -18390
Gxr = 965.4
Gyr = 217.4
```

$G_{zr} = -149.6$
Measured data from sensors:
Total change in current is 103.80 amps
Measured radial angle is 314.0s5 deg
Measured radial intensity is 2349.7 gammas
Measured axial intensity is 390.7 gammas
Radial angle match = 0.00
Radial intensity match = −0.0
Axial intensity match = −84.0

Bit is 18.20 feet right of center at an elevation of 66.33 feet.

$j_f = 51.55$
$H_{xf} = -37810$
$H_{yf} = -29983$
$H_{zf} = -18244$
$G_{xf} = 965.4$
$G_{yf} = 217.2$
$G_{zf} = -149.6$
$j_r = -51.55$
$H_{xr} = -35741$
$H_{yr} = -31173$
$H_{zr} = -18450$
$G_{xr} = 965.4$
$G_{yr} = 217.4$
$G_{zr} = -149.4$
Measured data from sensors:
Total change in current is 103.10 amps
Measured radial angle is 313.52 deg
Measured radial intensity is 2349.9 gammas
Measured axial intensity is 466.2 gammas
Radial angle match = 0.00
Radial intensity match = 0.1
Axial intensity match = −8.4

Bit is 17.99 feet right of center at an elevation of 66.37 feet.
Average bit position = 18.09 feet right of center and 66.35 feet elevation.
For point P5:

Bit position toward exit point is 93465.6 feet
$j_f = 51.45$
$H_{xf} = -40014$
$H_{yf} = -28456$
$H_{zf} = -17051$
$G_{xf} = 972.0$
$G_{yf} = 178.9$
$G_{zf} = -156.5$
$j_r = -51.45$
$H_{xr} = -38688$
$H_{yr} = -29352$
$H_{zr} = -18440$
$G_{xr} = 972.2$
$G_{yr} = 178.7$
$G_{zr} = -156.7$
Measured data from sensors:
Total change in current is 102.90 amps
Measured radial angle is 320.91 deg
Measured radial intensity is 1444.3 gammas
Measured axial intensity is 1550.6 gammas
Radial angle match = 0.01
Radial intensity match = −0.0
Axial intensity match = 11.3

Bit is 17.85 feet right of center at an elevation of 70.95 feet.

$j_f = 50.85$
$H_{xf} = -40014$
$H_{yf} = -28431$
$H_{zf} = -17051$
$G_{xf} = 972.0$
$G_{yf} = 178.7$
$G_{zf} = -156.5$
$j_r = -50.85$
$H_{xr} = -38737$
$H_{yr} = -29376$
$H_{zr} = -18428$
$G_{xr} = 972.0$
$G_{yr} = 178.7$
$G_{zr} = -156.5$
Measured data from sensors:
Total change in current is 101.70 amps
Measured radial angle is 323.57 deg
Measured radial intensity is 1442.1 gammas
Measured axial intensity is 1529.8 gammas
Radial angle match = 0.009
Radial intensity match = 0.1
Axial intensity match = 18.2

Bit is 18.49 feet right of center at an elevation of 71.28 feet.
Average bit position = 18.17 feet right of center and 71.12 feet elevation.

Although the invention has been described in conjunction with the foregoing specific embodiment, many alternatives, variations and modificaitons are apparent to those of oridinary skill in the art. Those alternatives, variations and modifications are intended to fall within the spirit and scope of the appended claims.

What is claimed is:

1. A method for tracking the progress of a borehole made by a drilling assembly, comprising the steps of:
   generating a magnetic field by flowing a constant current through a conductive loop made up of straight segments placed on the surface of the ground above the proposed path of the borehole;
   measuring the magnetic field by means of a probe fixed to the drilling assembly with three orthogonally oriented magnetometers;
   iteratively calculating the theoretical magnetic field vector produced by the current flowing through the conductive loop at discrete points below the conductive loop until the calculated field vector is approximately equal to the measured magnetic field vector;
   determining the location of the probe as being that point below the ground surface where the measured magnetic field vector most nearly matches the theoretically calculated magnetic field vector.

2. The method as set forth in claim 1 comprising the additional steps of:
   measuring the inclination and roll angles of the probe with respect to a normal coordinate system by means of three orthogonally oriented accelerometers;
   mapping the measured magnetic field vector from a probe coordinate system to the normal coordinate system before comparing the measured and calculated magnetic field vectors.

3. The method as set forth in claim 1 wherein the measured magnetic field vector is that resulting from the vectorial subtration of the field vector measured when current is made to flow through the loop in one direction from the field vector measured when an equal amount of current is made to flow through the loop in the opposite direction.

4. A system for tracking the progress of a borehole made by a drilling assembly, comprising:

a conductive loop made up of straight segments to be placed on the surface of the ground above the proposed path of the borehole;

means for applying constant current to the loop; a probe fixed to the drilling assembly having three orthogonally oriented magnetometers for measuring the magnetic field vector at the probe's location and three orthogonally oriented accelerometers for determining the orientation of the magnetometers; and means for iteratively calculating the magnetic field vector existing at discrete points below the conductive loop produced by the constant current flowing through the conductive loop until an approximate match between the measured and calculated magnetic field vectors is found.

5. A method for locating the position of an underground probe having three orthogonally oriented magnetometers and three orthogonally oriented accelerometers mounted within with respect to a normal coordinate system, comprising the steps of:

generating a magnetic field by flowing a constant current through a conductive loop made up of straight segments located on the surface of the ground above the probe;

measuring the resulting magnetic field vector with respect to a probe coordinate system at the location of the probe by means of three orthogonally oriented magnetometers;

measuring the inclination and roll angles of the probe with respect to the normal coordinate system by means of three orthogonally oriented accelerometers;

mapping the measured magnetic field vector from the probe coordinate system to the normal coordinate system by performing a rotation of axes transformation according to the measured inclination and roll angles;

calculating the theoretical magnetic field vector produced by the same constant current flowing through the conductive loop for discrete points below the conductive loop in the normal coordinate system until an approximate match between the measured and calculated field vectors is found; and determining the location of the probe as that point in the normal coordinate system where the calculated theoretical magnetic field vector most nearly matches the measured magnetic field vector mapped to the normal coordinate system.

6. The method as set forth in claim 5 wherein the measured magnetic field vector is that resulting from applying current to the conductive loop in one direction to generate a first magnetic field vector at the probe, applying current to the conductive loop in the opposite direction to generate a second magnetic field vector at the probe, and vectorially subtracting the second field vector from the first field vector, and further wherein the current value used to calculate the theoretical magnetic field vectors is the sum of the current magnitudes used to generate the first and second magnetic field vectors.

7. The method as set forth in claim 5 wherein the calculated theoretical magnetic field vector at each point is the vector summation of the magnetic field vector of point P resulting from each corner at point N of the conductive loop according to the formula:

$$H = (I \times U) \frac{j(1 + (I \cdot U))}{R(1 - (I \cdot U)^2)}$$

where H is the magnetic field vector, R is the distance from point P to N, U is a unit vector in the direction from P to N, I is a unit vector in the direction of the current in the conductor segment, and j is the magnitude of the current which is positive or negative according to whether the corner is considered a current source or a current sink.

* * * * *